(12) United States Patent
Kume et al.

(10) Patent No.: US 8,718,859 B2
(45) Date of Patent: May 6, 2014

(54) TRAVELING VEHICLE AND BED

(75) Inventors: Yohei Kume, Osaka (JP); Hideo Kawakami, Osaka (JP); Shohei Tsukada, Osaka (JP); Tohru Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 456 days.

(21) Appl. No.: 13/122,794

(22) PCT Filed: Jul. 29, 2010

(86) PCT No.: PCT/JP2010/004808
§ 371 (c)(1),
(2), (4) Date: Apr. 6, 2011

(87) PCT Pub. No.: WO2011/013377
PCT Pub. Date: Feb. 3, 2011

(65) Prior Publication Data
US 2011/0196562 A1    Aug. 11, 2011

(30) Foreign Application Priority Data
Jul. 30, 2009   (JP) .................. 2009-177358

(51) Int. Cl.
*G01C 22/00*   (2006.01)
(52) U.S. Cl.
USPC ............... 701/23; 180/204; 180/168; 180/6.5
(58) Field of Classification Search
USPC ............ 701/23; 180/204, 168, 6.5, 210, 420, 180/235; 5/81.1 R; 297/354.1; 715/771; 60/468, 489; 137/382, 377; 280/269, 280/730.2, 124.137; 463/23, 6; 474/11
See application file for complete search history.

(56) References Cited

U.S. PATENT DOCUMENTS 5,114,175 A * 5/1992 Sakai ................... 280/124.137
5,813,933 A * 9/1998 Tsukamoto et al. ............ 474/11
(Continued)

FOREIGN PATENT DOCUMENTS

JP   5-51330       7/1993
JP   2000-325406   11/2000
(Continued)

OTHER PUBLICATIONS

International Search Report issued Sep. 14, 2010 in International (PCT) Application No. PCT/JP2010/004808.

*Primary Examiner* — Behrang Badii
(74) *Attorney, Agent, or Firm* — Wenderoth, Lind & Ponack, L.L.P.

(57) ABSTRACT

A traveling vehicle (12) is self-propelled and docked in a quadrilateral docking area (20) having an entrance (55) on one side thereof, and includes: a docking point obtainment unit which obtains first to fourth points indicating positions of four corners of the docking area and represented in relative coordinates with respect to a position of the traveling vehicle (12); a reference distance detection unit (35) which obtains a reference distance indicating a distance between the traveling vehicle (12) and the docking area (20); and a movement control unit (33) which controls movement of the traveling vehicle (12) moving to the docking area (20), based on the first and second points when the reference distance Ls is not shorter than a first correction distance N1, and based on at least the third and fourth points when the reference distance Ls is shorter than the first correction distance N1. The first and second points are located on an entrance (55) side of the docking area, and the third and fourth points are located on a rear side.

6 Claims, 13 Drawing Sheets

(56) References Cited

U.S. PATENT DOCUMENTS

| | | | |
|---|---|---|---|
| 6,135,228 A * | 10/2000 | Asada et al. | 180/204 |
| 6,652,376 B1 * | 11/2003 | Yoshida et al. | 463/6 |
| 6,763,905 B2 * | 7/2004 | Cocco et al. | 180/210 |
| 7,661,701 B2 * | 2/2010 | Hirata | 280/730.2 |
| 2003/0130031 A1 * | 7/2003 | Yoshida et al. | 463/23 |
| 2007/0046001 A1 * | 3/2007 | Hirata | 280/730.2 |
| 2010/0212087 A1 * | 8/2010 | Leib et al. | 5/81.1 R |

FOREIGN PATENT DOCUMENTS

| | | |
|---|---|---|
| JP | 2002-287824 | 10/2002 |
| JP | 2008-94560 | 4/2008 |
| JP | 2008-210403 | 9/2008 |

\* cited by examiner

TRAVELING VEHICLE AND BED

TECHNICAL FIELD

The present invention relates to a traveling vehicle which automatically moves to a docking area of a stationary unit, and a bed including a stationary unit with which a traveling vehicle automatically combines.

RELATED ART

In hospitals and nursing-care facilities, patients and care-receivers move from their rooms where they lie on a bed to other places more than once a day. For the moving, patients and care-receivers are transferred from their beds to wheelchairs usually manually by nurses or care-givers. Such transferring of patients and care-receivers has been heavy physical burdens on the nurses and care-givers.

A bed has been presented which allows use of a separable part of the base unit of the bed as a wheelchair so that the burdens of the transferring are reduced (for example, see Patent Literature 1).

FIG. 14 schematically illustrates a perspective view of a configuration of the bed according to Patent Literature 1.

In the configuration, the bed disclosed in Patent Reference 1 has a base board, which is a base unit of the bed, divided into three parts aligned in the width direction of the bed main body 1, and an middle base board 2, which is the middle one of the three parts, with a trolley 3 is separable from the bed main body 1 so as to be used as a wheelchair by a patient to move. When the middle base board 2 with the trolley 3 is separated from the bed main body 1, one of lateral base boards 4 sandwiching the middle base board 2 is elevated above the bed main body 1 using a rotary device 5 provided on the bed main body 1.

Similarly, when the middle base board 2 with the trolley 3 are combined with the bed main body 1 to form a bed, the trolley 3 is moved to the bed main body 1 so as to place the middle base board 2 at a predetermined position. Then, the lateral base board 4 elevated above the bed main body 1 is lowered to be level with the middle base board 2 using the rotary device 5.

[Citation List]
[Patent Literature]
[PTL 1] Japanese Utility Model Application Publication Number 05-51330

SUMMARY OF INVENTION

The traveling vehicle according to an aspect of the present invention is self-propelled and docked in a docking area which is a quadrilateral area and has an entrance on one side of the quadrilateral area, and includes: docking point obtainment unit configured to obtain a first point, a second point, a third point, and a fourth point which indicate positions of four corners of the docking area and are represented in relative coordinates with respect to a position of the traveling vehicle, the first point and the second point being located on an entrance side of the docking area, and the third point and the fourth point being located on a rear side of the docking area; a reference distance detection unit configured to obtain a reference distance indicating a distance between the traveling vehicle and the docking area; and a movement control unit configured to control movement of the traveling vehicle moving to the docking area, based on the first point and the second point when the reference distance is equal to or longer than a first correction distance, and based on at least the third point and the fourth point when the reference distance is shorter than the first correction distance.

Furthermore, the traveling vehicle according to an aspect of the present invention is a quadrilateral area and has an entrance on one side of the quadrilateral area, and includes: a docking point obtainment unit (i) including a coordinate measurement device which is provided to the traveling vehicle and obtains relative coordinates of a plurality of points on an object with respect to a position of the traveling vehicle by measurement, and (ii) configured to obtain, based on a result of the measurement performed by the coordinate measurement device, a first point, a second point, a third point, and a fourth point which indicate positions of four corners of the docking area and are represented in relative coordinates with respect to a position of the traveling vehicle, the first point and the second point being located on an entrance side of the docking area, and the third point and the fourth point being located on a rear side of the docking area; and a movement control unit configured to control movement of the traveling vehicle moving to the docking area, based on the first point and the second point when the first point and the second point are within a measurement range of the coordinate measurement device, and based on at least the third point and the fourth point when at least one of the first point and the second point are out of the measurement range.

Furthermore, the docking point obtainment unit may include a docking point detection unit configured to determine, from the relative coordinates obtained from the coordinate measurement device, a point at a shortest distance within a range of positive angles to be the first point, a point at a shortest distance within a range of negative angles to be the second point, a point at a longest distance within a range of positive angles included between an angle of the first point and an angle of the second point to be the third point, and a point at a longest distance within negative angles included between an angle of the first point and an angle of the second point to be the fourth point.

Furthermore, the docking point obtainment unit may include a docking point detection unit configured to determine, from the relative coordinates obtained from the coordinate measurement device, a point at a shortest distance within a range of positive angles to be a first tentative point, a point at a shortest distance within a range of negative angles to be a second tentative point, a point at a longest distance within a range of positive angles to be a third tentative point, and a point at a longest distance within negative angles and a fourth tentative point, and a docking area recognition unit configured to compare, with a reference dimension stored in advance, at least one of a distance between the first tentative point and the second tentative point, a distance between the second tentative point and the third tentative point, a distance between the third tentative point and the fourth tentative point, and a distance between the first tentative point and the fourth tentative point, and determine the first tentative point to be the first point, the second tentative point to be the second point, the third tentative point to be the third point, and the fourth tentative point to be the fourth point, when the comparison shows a match between the first to fourth tentative points and the reference dimension.

DESCRIPTION OF EMBODIMENTS

Embodiments of the present invention are described below with reference to the drawings. In the following description, the same components are denoted with the same reference signs, and the description thereof is accordingly omitted.

Embodiment 1

Figure 1:
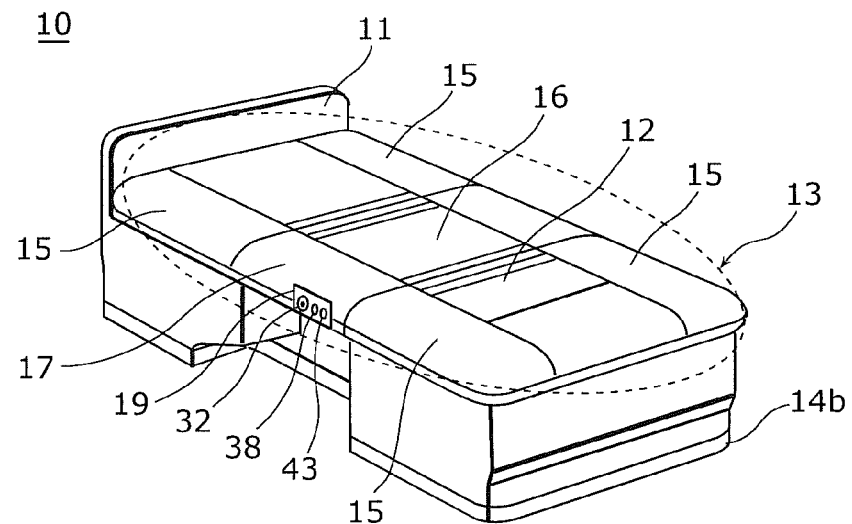
FIG. 1 illustrates a perspective view of a bed according to Embodiment 1 of the present invention.

FIG. 1 illustrates a perspective view of a bed according to Embodiment 1 of the present invention.

Figure 2:
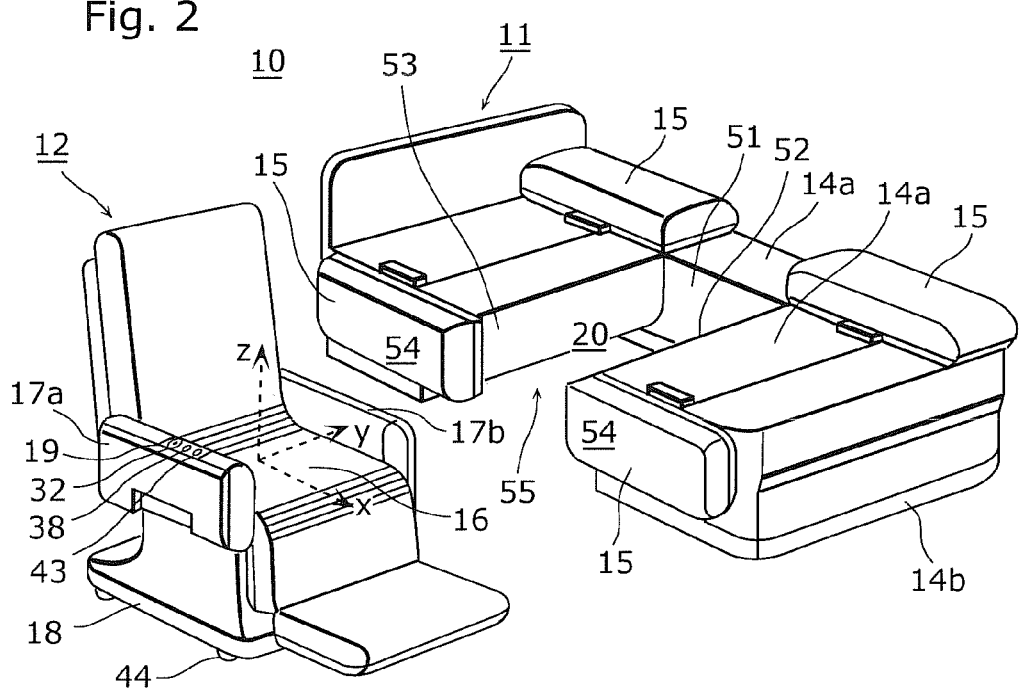
FIG. 2 illustrates a perspective view of a stationary unit and a traveling vehicle separated from each other according to Embodiment 1 of the present invention.

FIG. 2 illustrates a perspective view of a separated stationary unit and a traveling vehicle.

For ease of understanding, a coordinate system having an x-axis, a y-axis, and a z-axis which are mutually orthogonal is set for the traveling vehicle 12 (see FIG. 2). A plane containing the x-axis and the y-axis is a horizontal plane parallel to the ground, and the x-axis extends in the front direction of the traveling vehicle 12. The coordinate system has an origin at the center of a pedestal unit 18.

As shown in FIG. 1 and FIG. 2, the bed 10 according to Embodiment 1 includes a stationary unit 11 and a traveling vehicle 12. The stationary unit 11 of the bed 10 includes a base support unit 14a, a foot unit 14b which supports the base support unit 14a, and lateral base units 15.

The traveling vehicle 12 of the bed 10 is separable from (or combined with) the stationary unit 11, and serves as a wheelchair changeable between a flat position and a chair position. In addition, the traveling vehicle 12 includes a seat unit 16, a right armrest unit 17a, a left armrest unit 17b, and the pedestal unit 18. When the traveling vehicle 12 is in combination with the stationary unit 11 to be part of the bed 10, the seat unit 16, and the right and left armrests 17a and 17b of the traveling vehicle 12 serves as a base unit 13 of the bed 10. In the middle part of the stationary unit 11, there is a docking area 20 recessed from one side of the stationary unit 11 as shown in FIG. 2. The traveling vehicle 12 fits in the docking area 20 so that the stationary unit 11 and the traveling vehicle 12 combine to be the bed 10.

The docking area 20 is a rectangular area recessed in the middle part of a front panel 54 toward the rear side defined by a rear panel 51, a right side panel 52, a left side panel 53, and the entrance 55. Here, the rear panel 51 is a lateral face containing a line connecting a point C and a point D shown in FIG. 4. The right side panel 52 is a lateral face containing a line connecting a point B and a point D shown in FIG. 4. The left side panel 53 is a lateral face containing a line connecting a point A and the point C shown in FIG. 4. The entrance 55 is a plane containing a line connecting the point A and the point B shown in FIG. 4.

When the stationary unit 11 and the traveling vehicle 12 are combined as shown in FIG. 1, the base unit 13 is made up of the lateral base units 15, the seat unit 16, the right armrest unit 17a, and the left armrest unit 17b.

In addition, as shown in FIG. 1 and FIG. 2, an operation panel (remote control) 19 for controlling the operation of the bed 10 is provided at the right armrest unit 17a. The operation panel 19 is located on a side of the base unit 13 (armrest unit 17) when the stationary unit 11 and the traveling vehicle 12 are combined (see FIG. 1). The operation panel 19 is located on an upper face of the right armrest unit 17a when the traveling vehicle 12 is serving as a wheelchair (see FIG. 2).

Such positions of the operation panel 19 in the above configuration allow a care-giver or a care-receiver to easily handle the bed 10 (and the traveling vehicle 12).

That is, the bed 10 in such a configuration allows a care-receiver lying thereon to directly separate or combine the traveling vehicle 12 and the stationary unit 11 of the bed using the operation panel 19 in a posture for easy back raising or leg raising. The care-receiver is therefore allowed not only to comfortably lie on the bed 10 but also to safely and comfortably move by the traveling vehicle 12 (wheelchair) having a shape shown in FIG. 2 without transfer. The configuration according to Embodiment 1 thus provides the bed 10 which is less burdensome for care-givers. In addition, because the traveling vehicle 12 (wheelchair) is integrated with the stationary unit 11 when serving as part of the bed 10, no particular space for stowing the traveling vehicle 12 (wheelchair) is necessary when the traveling vehicle 12 is used as the bed 10.

Figure 3:
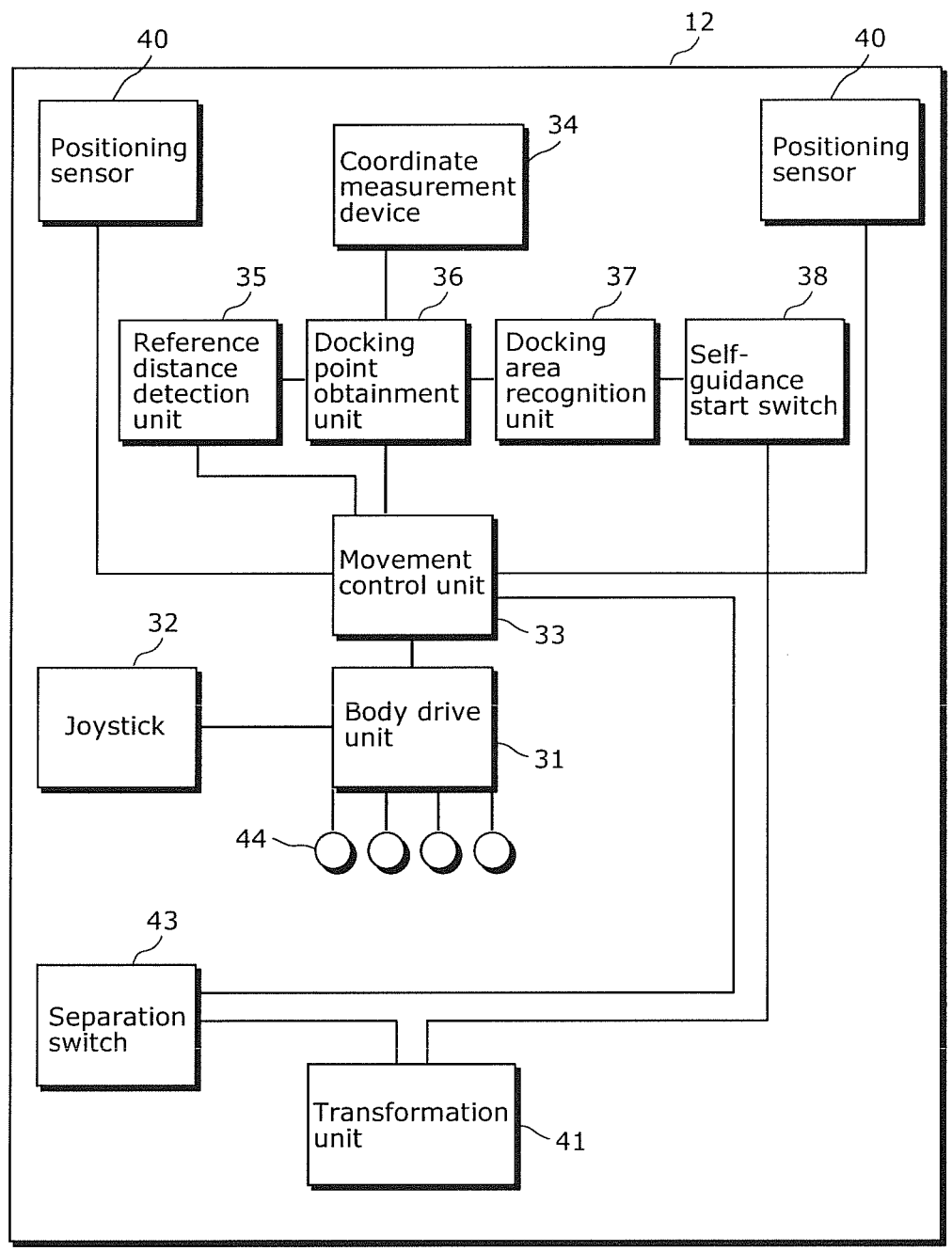
FIG. 3 is a block diagram showing a functional configuration and a system configuration of the traveling vehicle.

The traveling vehicle 12 (wheelchair) has a body drive unit 31 including a motor (see FIG. 3). The motor provides drive force to allow the traveling vehicle 12 to run. The body drive unit 31 enables the traveling vehicle separated from the stationary unit 11 to independently run as a wheelchair 12 under control using a joystick 32 provided on the operation panel 19.

In addition, the traveling vehicle 12 separated from the stationary unit 11 as shown in FIG. 2 combines with the stationary unit 11 so as to fit in the docking area 20, and then automatically transforms to be in the state as shown in FIG. 1. The traveling vehicle 12 has a coordinate measurement device 34 (see FIG. 3) so that the traveling vehicle 12 automatically combines with the stationary unit 11 so as to fit in the docking area 20. In Embodiment 1, the coordinate measurement device 34 of the traveling vehicle 12 obtains data of relative polar coordinates of points on the stationary unit 11 with respect to the traveling vehicle 12 by scanning laser light across a horizontal plane. The traveling vehicle 12 corrects its approaching position and orientation based on the data of relative polar coordinates obtained by the coordinate measurement device 34, so that the traveling vehicle 12 can automatically moves into the docking area 20.

The coordinate measurement device 34, which is not shown in FIG. 2, is provided on a face of the pedestal unit 18 in the y-axis direction, on the side of the left armrest unit 17b.

The following describes a method of correcting the approaching position and the orientation of the traveling vehicle 12.

FIG. 3 is a block diagram showing a functional configuration and a system configuration of the traveling vehicle 12.

The traveling vehicle 12 is supported by four wheels 44 disposed between the pedestal unit 18 and a floor. The wheels 44 allow the traveling vehicle 12 to move in all directions. For example, omni wheels are used as the wheels 44. In addition, the traveling vehicle 12 has the body drive unit 31 which provides drive force to each of the four wheels 44, the joystick 32 which is a man-machine interface for providing the body drive unit 31 with instructions, such as stop, move, directions, and a movement control unit 33 which has a self-guidance function for correction of the approaching position and the orientation.

The traveling vehicle 12 includes, as units for detecting docking points, the coordinate measurement device 34, a docking point detection unit 36, and a docking area recognition unit 37.

The coordinate measurement device 34 obtains relative coordinates of points on an object 21 with respect to the position of the traveling vehicle 12 by measurement. In Embodiment 1, the coordinate measurement device 34 is provided on a lateral face of the traveling vehicle 12. The coordinate measurement device 34 projects laser light and receives reflection from the object 21 to determine a distance between the coordinate measurement device 34 and the object 21 based on a phase difference between the projected light and incident light. In addition, the coordinate measurement device 34 is capable of rotary-scanning laser light across a horizontal plane, and outputting information on a rotation angle of the laser light and a distance at the time of reception of incident light (or projection of laser light). In Embodiment 1, because the coordinate measurement device 34 is provided on a lateral face of the traveling vehicle 12, it is impossible for the coordinate measurement device 34 to project laser light toward the traveling vehicle 12. An effective measurement range of the coordinate measurement device 34 therefore spans 180 degrees on the lateral face of the traveling vehicle 12. In practice, the effective measurement range is narrower than 180 degrees due to protrusions on the traveling vehicle 12. Mounting the coordinate measurement device 34 on a corner of the traveling vehicle 12 provides a wider effective measurement range up to, for example, 270 degrees.

The docking point detection unit 36 detects docking points by analyzing data of the relative polar coordinates (for example, data obtained by measuring across a maximum measurement range of 120 degrees by degrees) obtained by the coordinate measurement device 34.

The docking points detected by the docking point detection unit 36 are a first tentative point A, a second tentative point B, a third tentative point C, a fourth tentative point D, and a center point H. The first tentative point A is a point at the shortest distance within a range of positive angles. The second tentative point B is a point at the shortest distance within a range of negative angles. The third tentative point C is a point at the longest distance within a range of positive angles. The fourth tentative point D is a point at the longest distance within a range of negative angles. The center point H is a point represented by data of a polar coordinate indicating a degree of zero. The docking points are described in detail later.

Optionally, the docking points detected by the docking point detection unit 36 may be a first point P1, a second point P2, a third point P3, a fourth point P4, and the center point H. The first point P1 is a point at the shortest distance within a range of positive angles. The second point P2 is a point at the shortest distance within a range of negative angles. The third point P3 is a point at the longest distance within a range of positive angles included between the angle of the first point P1 and the angle of the second point P2. The fourth point P4 is a point at the longest distance within a range of the negative angles included between the angle of the first point P1 and the angle of the second point P2. The center point H is a point represented by data of a polar coordinate indicating a degree of zero.

The positive angles means rotation angles by which laser projected from the coordinate measurement device 34 pivots about the z-axis in the counterclockwise direction from the y-axis perpendicular to the lateral face of the traveling vehicle 12, and the negative angles means rotation angles by which the laser pivots about the z-axis in the clockwise direction from the y-axis. The coordinate measurement device 34 is provided on the lateral face of the pedestal unit 18 in a manner such that the center line of the coordinate measurement device 34 coincides with the y-axis direction of the base unit 18.

The docking area recognition unit 37 recognizes whether or not the four sides of a quadrilateral having, as vertices, the first tentative point A, the second tentative point B, the third tentative point C, and the fourth tentative point D detected by the docking point detection unit 36 are the four sides defining the docking area 20. This recognition is described in detail later.

The traveling vehicle 12 further includes a reference distance detection unit 35 which calculates a reference distance Ls, which is a distance between a reference point Ps set in the docking area 20 and the traveling vehicle 12, based on the docking points detected by the docking point detection unit 36.

The traveling vehicle 12 further includes a self-guidance start switch 38 which lights up and waits for an operator's instruction when the docking area recognition unit 37 recognizes that the object is panels defining the docking area 20. The self-guidance start switch 38 is disposed on the operation panel 19.

The traveling vehicle 12 further includes proximity sensors 40 which detect contact of the traveling vehicle 12 with the object 21 on, for example, the front panel 54 when the traveling vehicle 12 moves in the xy-plane.

The traveling vehicle 12 further includes a transformation unit 41 and a separation switch 43. The transformation unit 41 allows the bed 10 to transform from the flat position to the chair position or from the chair position to the flat position. The separation switch 43 issues an instruction to transit from a state in which the stationary unit 11 and the traveling vehicle 12 are combined to a state in which the stationary unit 11 and the traveling vehicle 12 are separate. The separation switch 43 is disposed on the operation panel 19 along with the self-guidance start switch 38 and the joystick 32.

The following describes the situation in which the traveling vehicle 12 combines with the stationary unit 11 by self guidance.

Figure 4:
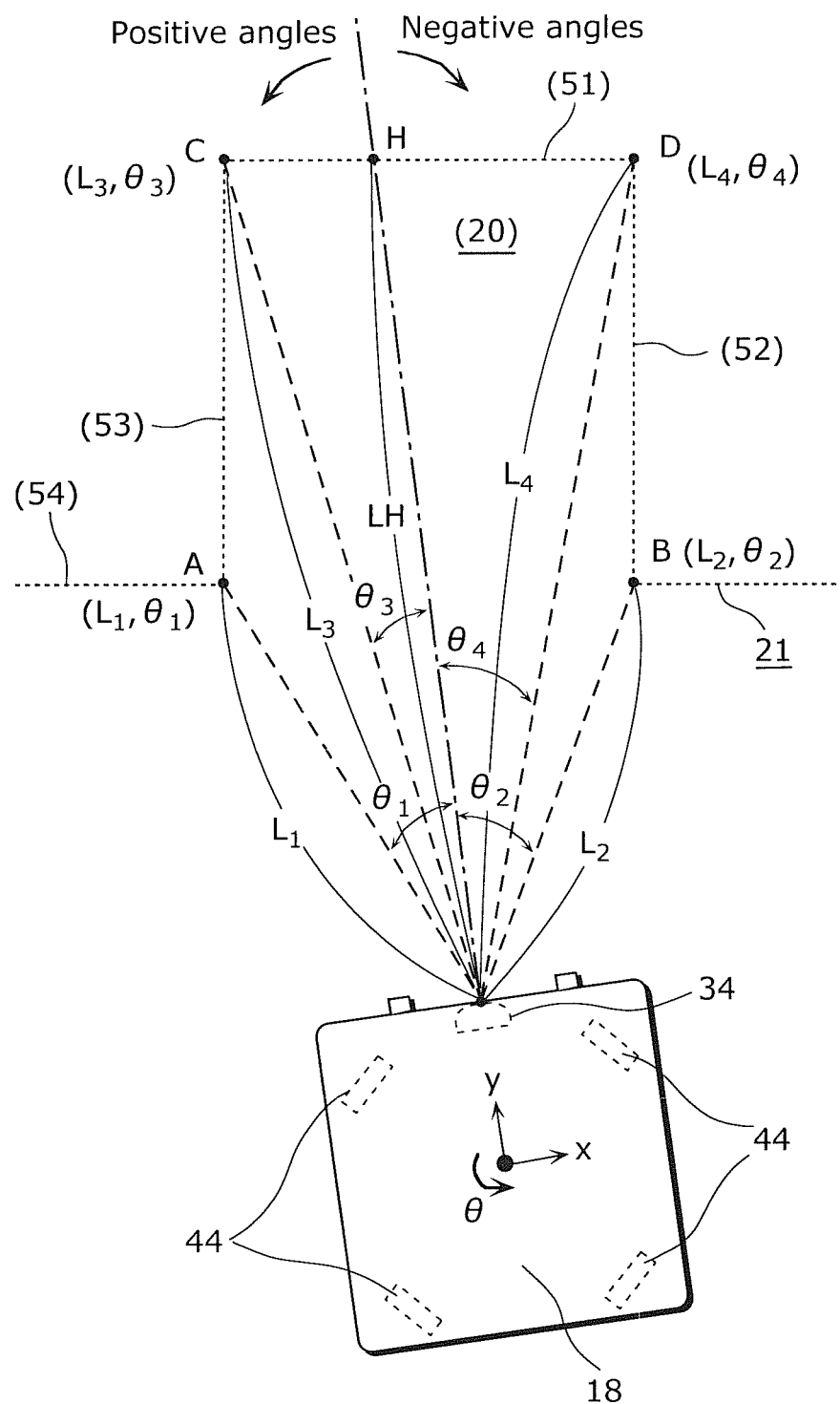
FIG. 4 illustrates a top view of a pedestal unit according to Embodiment 1 of the present invention.

FIG. 4 illustrates a plan view of the pedestal unit of the traveling vehicle 12 and an object viewed from thereabove.

The object 21 is an object to be measured by the coordinate measurement device 34 before the docking area recognition unit 37 recognizes the docking area 20. When the traveling vehicle 12 has approached the docking area 20 as shown in FIG. 4, each of the rear panel 51, the right side panel 52, the left side panel 53, and the front panel 54 is part of the object 21. The rotation angle θ is an angle of pivoting about the z-axis with respect to the y-axis.

First, in order to combine the stationary unit 11 and the traveling vehicle 12 separated from each other, an operator (for example, a care-receiver) operates the traveling vehicle 12 using the joystick 32 so as to approximate the traveling vehicle 12 to the docking area 20. At this time, the operator moves the traveling vehicle 12 to cause the coordinate measurement device 34 (the left side of the traveling vehicle 12) to face toward the docking area 20. Since the coordinate measurement device 34 is provided in the left side panel 53 in the y-axis direction of the pedestal unit 18, it is preferable that the operator (for example, a care-receiver) aboard the traveling vehicle 12 use the joystick 32 with his or her right hand, looking leftward.

The body drive unit 31 drives the four wheels 44 according to the operator's operation of the joystick 32. The wheels 44 are driven in all directions. Specifically, omni wheels are used as the wheels 44.

Here, the coordinate measurement device 34 provided in the left side panel 53 of the pedestal unit 18 uses a laser distance sensor having a maximum measurement range of scanning angles ±60 degrees (with reference to the y-axis at a degree of zero), an effective distance of four meters, and an angular resolution of one degree. A detection area is a range across which the coordinate measurement device 34 is capable of detecting the object by scanning laser light. The coordinate measurement device 34 measures distances between the coordinate measurement device 34 and the object 21 within the detection area and outputs the distances and angles at which the distances are measured.

In order to combine the traveling vehicle 12 and the stationary unit 11, the docking point detection unit 36 detects the first tentative point A, the second tentative point B, the third tentative point C, and the fourth tentative point D of the object 21 from the polar coordinate data obtained by the coordinate measurement device 34, and the docking area recognition unit 37 performs the recognition.

Here, a recess in the object 21 is the docking area 20 when the traveling vehicle 12 approaches the docking area 20. The traveling vehicle 12 does not recognize the recess in the object 21 as the docking area 20 until the recess in the object 21 is recognized as the docking area 20. The area to be assumed as the docking area 20 is accordingly referred to as a recess in the object 21 in the description of the operation before the recognition.

In Embodiment 1, the docking point detection unit 36 detects the third tentative point C and the fourth tentative point D only when they are in a range of angles included between the angle of the first tentative point A and the angle of the second tentative point B. In this condition, the recess in the object 21 can be detected using the first tentative point A the second tentative point B, the third tentative point C, and the fourth tentative point D.

The docking area recognition unit 37 recognizes whether or not a quadrilateral having, as vertices, the first tentative point A, the second tentative point B, the third tentative point C, and the fourth tentative point D detected by the docking point detection unit 36 is the docking area 20.

The docking area recognition unit 37 performs the recognition by comparing pre-register dimensions of the docking area 20 and dimensions of the four sides calculated from data of the polar coordinates of the four points, that is, the first tentative point A, the second tentative point B, the third tentative point C, and the fourth tentative point D, detected by the coordinate measurement device 34. That is, the docking area recognition unit 37 determines whether or not that a quadrilateral having, as vertices, the first tentative point A, the second tentative point B, the third tentative point C, and the fourth tentative point D detected by the coordinate measurement device 34 is the docking area 20 in which the traveling vehicle 12 fits.

Specifically, first, the docking area recognition unit 37 detects four points indicated by the following data of polar coordinates: $(L_1, \theta_1)$ of the first tentative point A at the shortest distance within a range of positive angles; $(L_2, \theta_2)$ of the second tentative point B at the shortest distance within a range of negative angles; $(L_3, \theta_3)$ of the third tentative point C at the longest distance within a range of positive angles included between the angle of the first tentative point A and the angle of the second tentative point B; and $(L_4, \theta_4)$ of the fourth tentative point D at the longest distance within a range of negative angles included between the angle of the first tentative point A and the angle of the second tentative point B. The positive angles are on the left of a center line H of the coordinate measurement device 34, and the negative angles on the right of the center line H. Next, the coordinate measurement device 34 compares the shape of a quadrilateral having, as vertices, the four points and the shape of the docking area 20 stored in a storage unit (not shown) of the traveling vehicle 12 in advance, and then recognizes that the recess in the object 21 is the docking area 20 when the shapes matches within an allowable tolerance.

Figure 5:
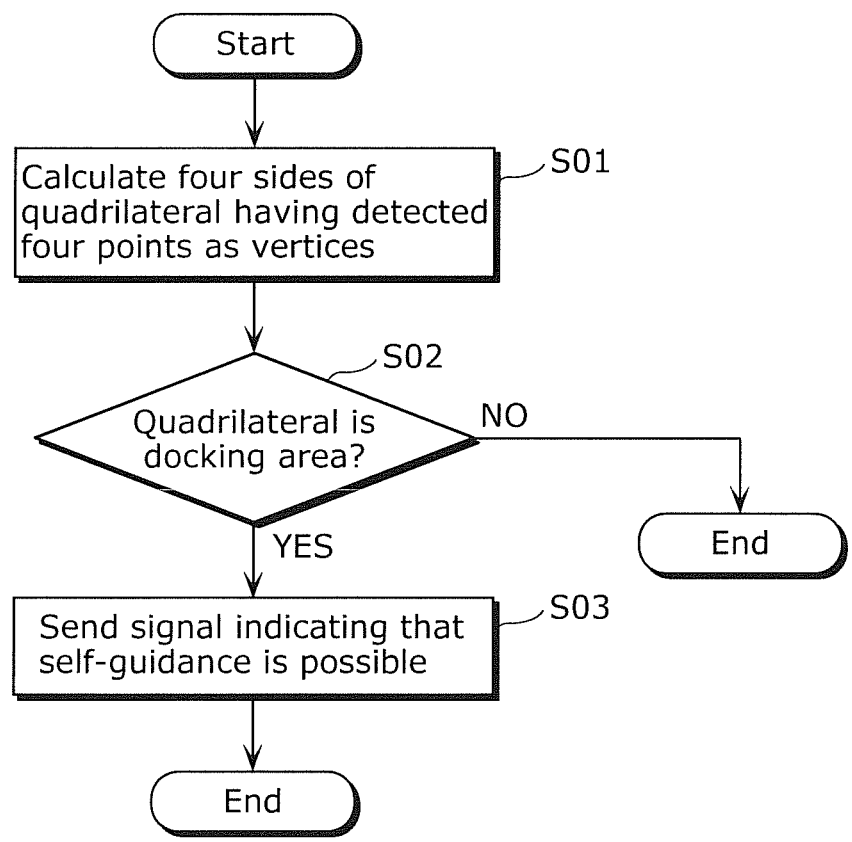
FIG. 5 is a flowchart of a docking area recognition unit according to Embodiment 1 of the present invention.

FIG. 5 is a flowchart of the docking area recognition unit 37. The following describes detection of the docking area 20 with reference to the flowchart.

First, the coordinate measurement device 34 constantly scans the detection area with laser light at a high speed to measure a distance and an angle of every point on the object 21. Next, the docking point detection unit 36 detects four points of the polar coordinate the first tentative point A, the second tentative point B, the third tentative point C, and the fourth tentative point D from the data of the measured polar coordinates for one cycle of scanning of the laser light.

Next, the docking area recognition unit 37 calculates four sides of a quadrilateral having, as vertices, the four points detected by the docking point detection unit 36, using the equations below (Math. 1) for one cycle of scanning of the laser light.

$$L_{AB} = \sqrt{L_1^2 + L_2^2 - 2L_1L_2\cos(\theta_1 + \theta_2)}$$

$$L_{CD} = \sqrt{L_3^2 + L_4^2 - 2L_3L_4\cos(\theta_3 + \theta_4)}$$

$$L_{BD} = \sqrt{L_2^2 + L_4^2 - 2L_2L_4\cos(\theta_2 - \theta_4)}$$

$$L_{AC} = \sqrt{L_1^2 + L_3^2 - 2L_1L_3\cos(\theta_1 - \theta_3)} \qquad \text{Math. 1}$$

Here, the equations (Math. 1) are used for calculating the lengths of the sides of the quadrilateral: the length $L_{AB}$ of the side between the first tentative point A and the second tentative point B; the length $L_{CD}$ of the side between the third tentative point C and the fourth tentative point D; the length $L_{BC}$ of the side between the second tentative point B and the third tentative point C; and the length $L_{BD}$ of the side between the second tentative point B and the fourth tentative point D (Step S01).

Next, the docking area recognition unit 37 compares the calculated lengths of the four sides and pre-registered reference dimensions indicating the docking area 20.

Figure 6:
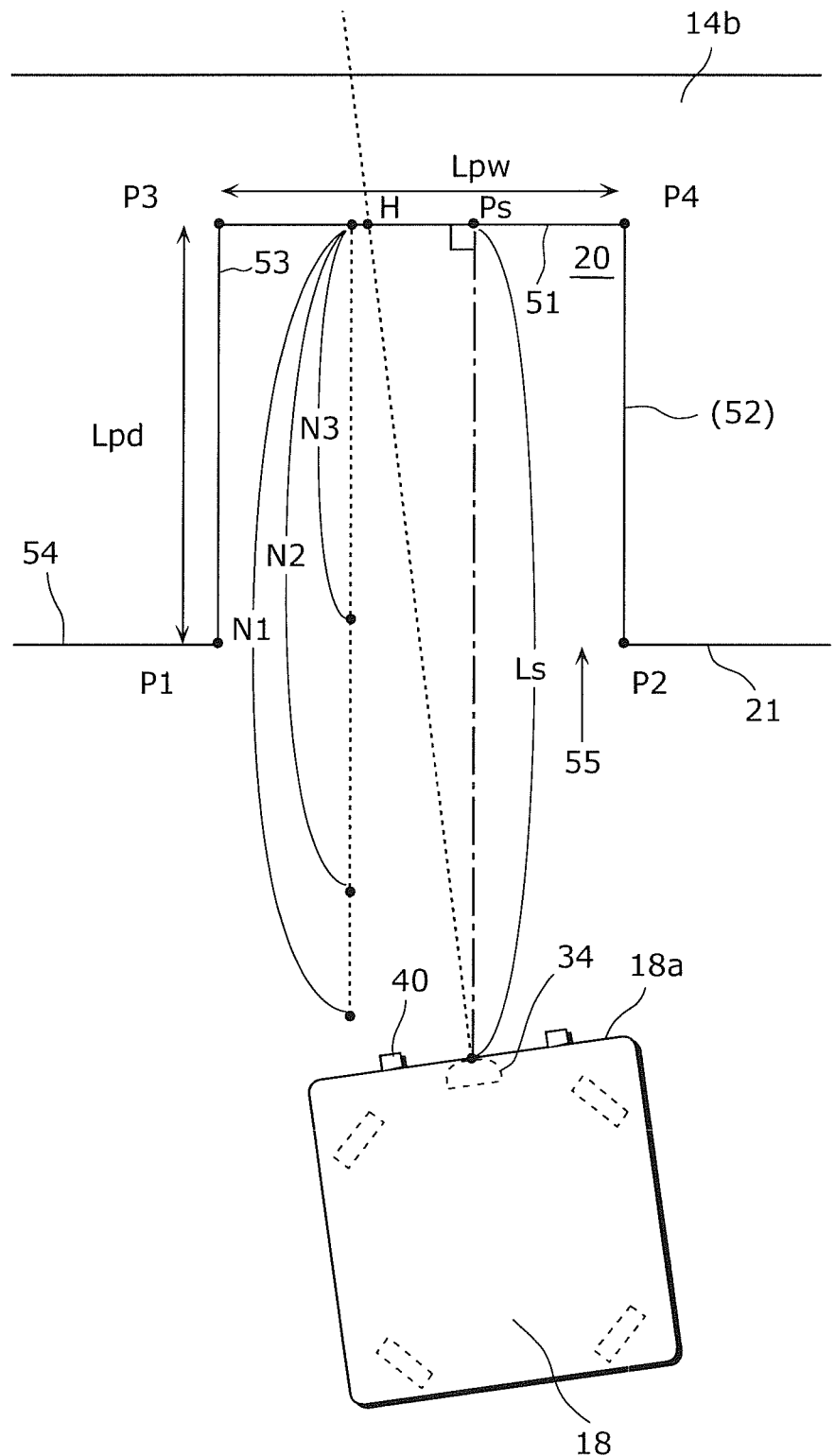
FIG. 6 illustrates a top view of the traveling vehicle and a foot unit of the stationary unit according to Embodiment 1 of the present invention.

FIG. 6, which illustrates a top view of the foot unit 14b and the pedestal unit 18, shows the stationary unit 11 from which the base support unit 14a is omitted.

The coordinate measurement device 34 is provided on the left side panel 53 of the pedestal unit 18. The coordinate measurement device 34 obtains data of polar coordinates up to the foot unit 14b of the base unit 18 by measurement.

In Embodiment 1, the distance between the first point P1 and the second point P2 and the distance between the third point P3 and the fourth point P4 are the same because the docking area 20 is a rectangle. The distance is hereinafter referred to as Lpw.

The first point P1, the second point P2, the third point P3, and the fourth point P4 indicate four corners of the docking area 20 in a horizontal plane, and are represented in relative coordinates with respect to the traveling vehicle 12. When a recess in the object 21 is determined to be the docking area 20, the first tentative point A, the second tentative point B, the third tentative point C, and the fourth tentative point D correspond to the first point P1, the second point P2, the third point P3, and the fourth point P4, respectively. It is to be noted that, in the calculations shown below, the docking points may be referred to as the first tentative point A, the second tentative point B, the third tentative point C, and the fourth tentative point D in the steps after the docking points are detected by the docking point detection unit 36 and before a quadrilateral is recognized as the docking area 20, and as the first point P1, the second point P2, the third point P3, and the fourth point P4 after a quadrilateral is recognized as the docking area 20.

In Embodiment 1, the distance between the first point P1 and the third point P3 and the distance between the second point P2 and the fourth point P4 are the same. The distance is hereinafter referred to as Lpd. Lpd and Lpw are calculated and pre-registered in the docking area recognition unit 37. The docking area recognition unit 37 determines whether or not all of the relational expressions (Math. 2) shown below are satisfied for $L_{AB}$, $L_{CD}$, $L_{AC}$, $L_{BD}$, Lpd, and Lpw.

$$0.95 \leq L_{AB}/Lpw \leq 1.05$$

$$0.95 \leq L_{CD}/Lpw \leq 1.05$$

$$0.95 \leq L_{AC}/Lpd \leq 1.05$$

$$0.95 \leq L_{BD}/Lpd \leq 1.05 \quad \text{(Math. 2)}$$

When all of the relational expressions (Math. 2) are satisfied for LAB, LCD, LAC, LBD, Lpd, and Lpw, the docking area recognition unit 37 recognizes, as the docking area 20, the quadrilateral having the four detected tentative points of the first tentative point A, the second tentative point B, the third tentative point C, and the fourth tentative point D, as vertices (Step S02). Then, the docking area recognition unit 37 determines that the traveling vehicle 12 can be now self-guided to the docking area 20, and therefore the docking area recognition unit 37 sends a signal indicating that self-guidance is possible to cause a self-guidance start switch 38 on the operation panel 19 to light up (Step S03).

Here, that all of the relational expressions (Math. 2) are satisfied for $L_{AB}$, $L_{CD}$, $L_{AC}$, $L_{BD}$, Lpd, and Lpw means that the result of comparison between the calculated lengths of the four sides and the reference dimensions of the docking area 20 matches within an allowable tolerance of 5%. In this case, the quadrilateral having the detected four points as vertices is determined to be the docking area 20. The criteria for the determination may be changed according to a situation.

On the other hand, when at least one of the relational expressions (Math. 2) is not satisfied for $L_{AB}$, $L_{CD}$, $L_{AC}$, $L_{BD}$, Lpd, and Lpw, the self-guidance process of the traveling vehicle 12 is terminated.

The docking area recognition unit 37 determines whether or not a quadrilateral is the docking area 20 and whether or not self-guidance is possible for each cycle of scanning (of the whole area) with laser light by the coordinate measurement device 34.

Figure 7:
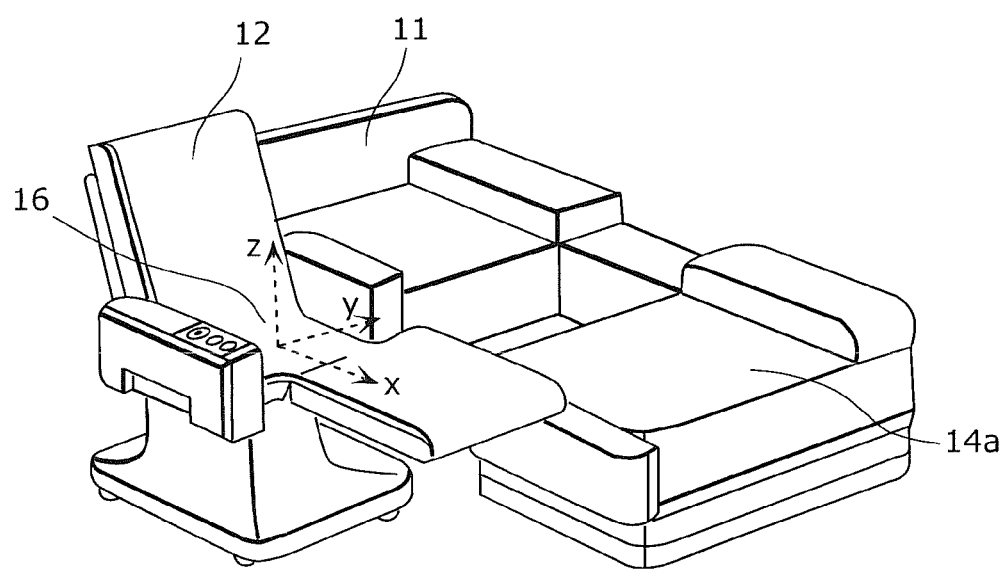
FIG. 7 illustrates a perspective view of the traveling vehicle and the stationary unit ready to combine according to Embodiment 1 of the present invention.

When the docking area recognition unit 37 determines that self-guidance is possible, the self-guidance start switch 38 is lit up. By seeing the self-guidance start switch 38 lighting, the operator (for example, a care-receiver) knows that the traveling vehicle 12 is ready to automatically combine with the stationary unit 11. When the operator needs to combine the traveling vehicle 12 and the stationary unit 11, the operator presses the self-guidance start switch 38. This activates the transformation unit 41, and a lower part of the seat unit 16 is elevated above the base support unit 14a as shown in FIG. 7. When the lower part of the seat unit 16 is elevated high enough not to hit against the base support unit 14a, the movement control unit 33 provides the body drive unit 31 with an operation instruction such that the traveling vehicle 12 combines with the stationary unit 11 while correcting its approaching position and orientation. At this time, the operator (for example, a care-receiver) aboard the traveling vehicle 12 moves together with the traveling vehicle 12.

The following describes how the traveling vehicle 12 automatically moves into the docking area 20 of the stationary unit 11. In order for the traveling vehicle 12 to smoothly move into the docking area 20, control laws of correction of the approaching position and orientation of the traveling vehicle 12 are changed depending on a positional relation between the traveling vehicle 12 and the docking area 20.

For this purpose, the movement control unit 33 obtains the reference distance Ls calculated by the reference distance detection unit 35. Here, the reference distance Ls is a length of a line which is perpendicular to the rear side of the docking area 20 (the side between the third point P3 and the fourth point P4) and extends to the coordinate measurement device 34 as shown in FIG. 6. The intersection between the perpendicular line and the rear side is the reference point Ps of the docking area 20.

The movement control unit 33 changes the control laws of correction of the approaching position and orientation of the traveling vehicle 12 according to the length of the reference distance Ls, and thereby allowing the traveling vehicle 12 to smoothly move into the docking area 20.

Figure 8:
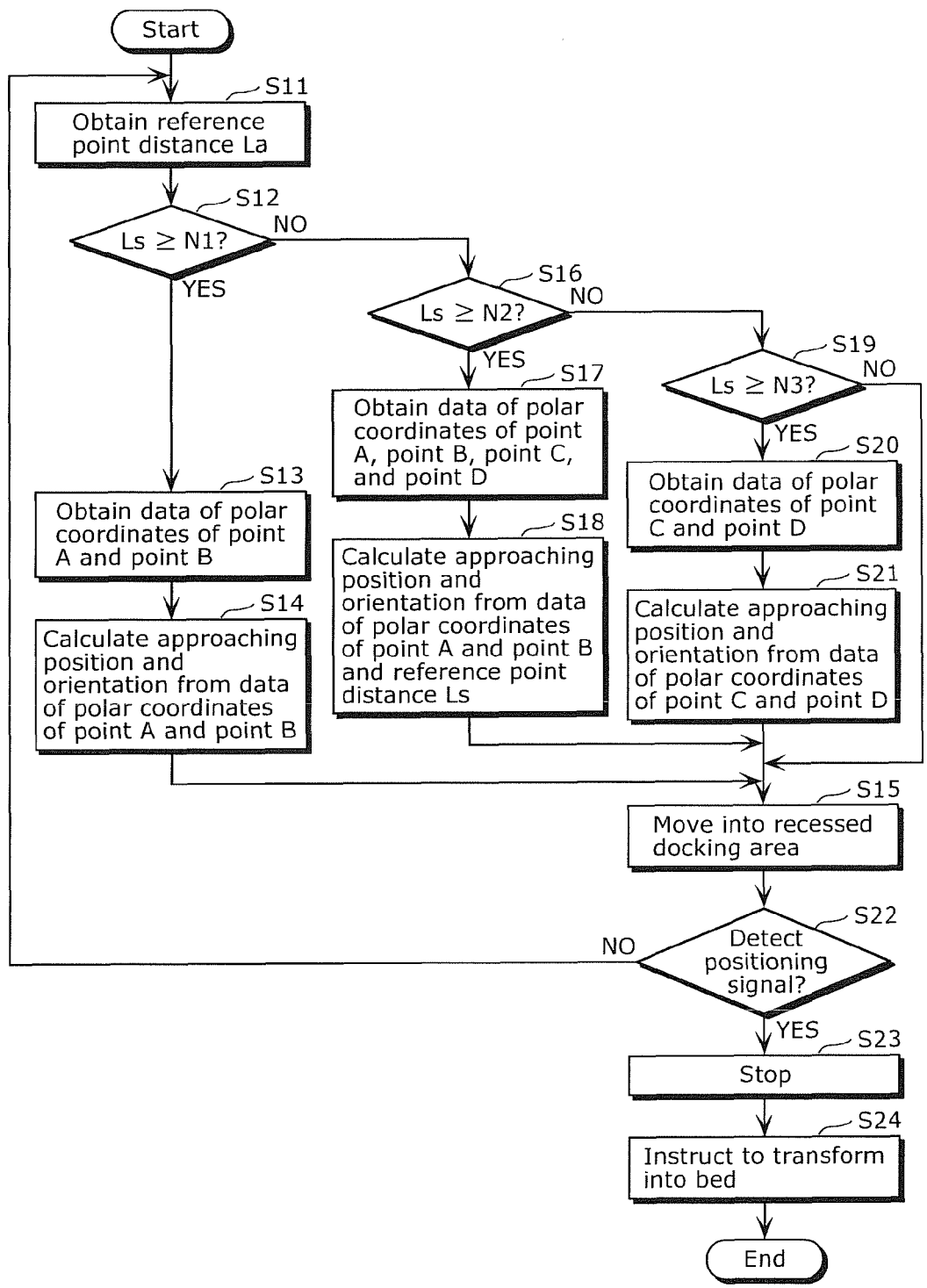
FIG. 8 is a flowchart of a movement control unit according to Embodiment 1 of the present invention.

The following describes the changing of the control laws of correction of the approaching position and orientation with reference to a flowchart of the movement control unit 33 shown in FIG. 8.

First, the movement control unit 33 obtains the reference distance Ls calculated by the reference distance detection unit 35 (Step S11). Here, the reference distance detection unit 35 calculates the reference distance Ls using the data of polar coordinates of the first tentative point A (the first point P1) and the second tentative point B (the second point P2) and distance LH, which is a distance to the center point H. The method of calculation of the reference distance Ls performed by the reference distance detection unit 35 is not limited to this. The reference distance detection unit 35 may calculate the reference distance Ls using the data of polar coordinates of the third tentative point C (the third point P3) and the fourth tentative point D (the fourth point P4) and the distance to the center point H, LH (see FIG. 4). When the position has been corrected to make the center line (a straight line passing through the center point H, the coordinate measurement device 34, and the center of the pedestal unit 18) approximately perpendicular to the rear side of the docking area 20, the length of the center line LH may be used as the reference distance Ls. There are more optional calculation methods: for example, the shortest distance present between the third tentative point C (the third point P3) and the fourth tentative point D (the fourth point P4) may be used as the reference distance Ls.

In other words, the reference distance Ls may be any distance which indicates a distance relationship between the docking area 20 of the stationary unit 11 and the traveling vehicle 12. In addition, although the reference point Ps is defined as an intersection between the rear side and the line extending from the coordinate measurement device 34 perpendicularly to the rear side as described above, the reference point Ps may be defined as any other point, such as the center or the median point of the docking area 20, as long as it can serve as a reference point (Step S11).

Next, the movement control unit 33 determines whether or not the obtained reference distance Ls is equal to or longer than a first correction distance N1 (Step S12). The first correction distance N1 is described in detail later.

When the reference distance Ls is equal to or longer than the first correction distance N1 (the traveling vehicle 12 is distant from the docking area 20), the movement control unit 33 obtains the data of the polar coordinates of the tentative points detected by the docking point detection unit 36: the polar coordinates of the first tentative point A at the shortest distance within a range of positive angles ($L_1$, $\theta_1$), and the polar coordinates of the second tentative point B at the shortest distance within a range of negative angles ($L_2$, $\theta_2$) (Step S13).

At this time, since the recess in the object 21 has been recognized as the docking area 20, the first point P1 at one inflection on the entrance side of the docking area 20 is the first tentative point A, and the second point P2 at the other inflection on the entrance side of the docking area 20 is the second tentative point B.

In order to cause the traveling vehicle 12 to move into the docking area 20, the movement control unit 33 corrects the approaching position and orientation of the traveling vehicle 12 with reference to the first point P1 and the second point P2 (the first tentative point A and the second tentative point B) of the docking area 20. The approaching position and orientation are corrected using the first point P1 and the second point P2 (the first tentative point A and the second tentative point B) when the reference distance Ls is equal to or longer than the first correction distance N1 because, in comparison with the third point P3 and the fourth point P4, the first point P1 and the second point P2 are so close to the traveling vehicle 12 that obtained data of distances and angles is more accurate.

In Embodiment 1, the first correction distance N1 is set to a distance such that first point P1 and the second point P2 is out of an appropriate measurement range of the coordinate measurement device 34 when the reference distance Ls is shorter than the first correction distance N1.

Here, the appropriate measurement range is a range within which the coordinate measurement device 34 accurately measures the first point P1 and the second point P2. For example, when a range within which the coordinate measurement device 34 can measures the first point P1 and the second point P2 on the edge of tolerance levels is a maximum measurement range, the appropriate measurement range is a range 30% smaller than the maximum measurement range. In Embodiment 1, since the maximum measurement range spans an angle of 120 degrees, the appropriate measurement range spans an angle of 84 degrees (±42 degrees).

The approaching position is corrected by changing the position of the pedestal unit 18 (the traveling vehicle 12) so as to move coordinate measurement device 34 closer to a perpendicular bisector of a segment between the first point P1 and the second point P2 or a segment between the third point P3 and the fourth point P4 of the docking area 20. The orientation is corrected by changing the orientation of the base unit 18 (the traveling vehicle 12) so as to make the lateral face 18a of the pedestal unit 18 and a segment between the first point P1 and the second point P2, or the lateral face 18a and a segment between the third point P3 and the fourth point P4 of the docking area 20 shown in FIG. 6 parallel. The position and orientation of the pedestal unit 18 (the traveling vehicle 12) are thus corrected with respect to the docking area 20 in order to allow the traveling vehicle 12 to combine with the stationary unit 11.

The approaching position and orientation are corrected according to the following expression (Math. 3).

$$\begin{bmatrix} F_v^x \\ F_v^y \\ F_v^\theta \end{bmatrix} = S \begin{bmatrix} K_{AB}^x(L_2 - L_1) \\ 0 \\ K_{AB}^\theta(L_2\cos\theta_2 - L_1\cos\theta_1) \end{bmatrix} + \\ (1-S)\begin{bmatrix} K_{CD}^x(L_4 - L_3) \\ 0 \\ K_{CD}^\theta(L_4\cos\theta_4 - L_3\cos\theta_3) \end{bmatrix}$$

Math. 3

$F_v^x$ denotes force in the x-axis direction applied to the base unit 18 in order to correct the approaching position. $F_v^y$ denotes force in the y-axis direction applied to the pedestal unit 18 in order to correct the approaching position. $F_v^\theta$ denotes moment applied to the base unit 18 in order to correct the orientation.

$K_{AB}^x$ denotes an approaching position correction gain for the first point P1 and the second point P2 (the first tentative point A and the second tentative point B). $K_{CD}^x$ denotes an approaching position correction gain for the third point P3 and the fourth point P4 (the third tentative point C and the fourth tentative point D). $K_{AB}^\theta$ denotes an orientation correction gain for the first point P1 and the second point P2 (the first tentative point A and the second tentative point B). $K_{CD}^\theta$ denotes an orientation correction gain for the third point P3 and the fourth point P4 (the third tentative point C and the fourth tentative point D).

Figure 9:
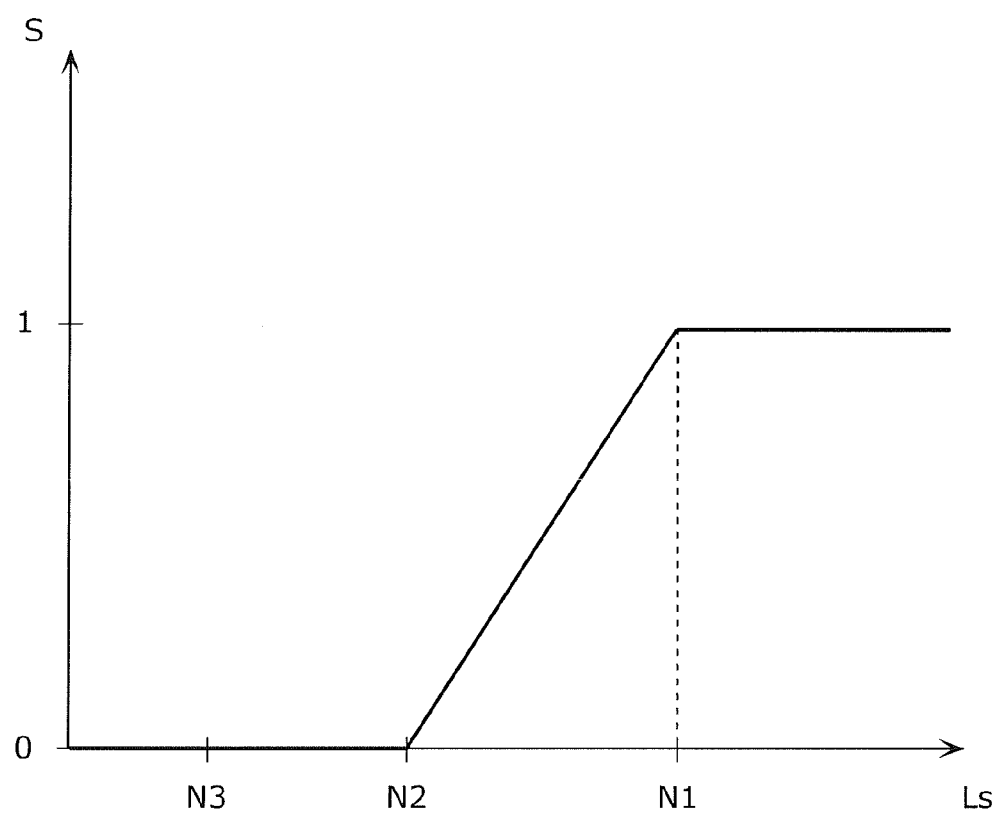
FIG. 9 shows a relationship between a reference distance Ls and a parameter according to Embodiment 1 of the present invention.

S denotes a parameter which changes according to the reference distance Ls (see FIG. 9 for the relationship between the reference distance Ls and the parameter S). In this case, reference distance Ls≥the first correction distance N1, therefore S=1.

Figure 10:
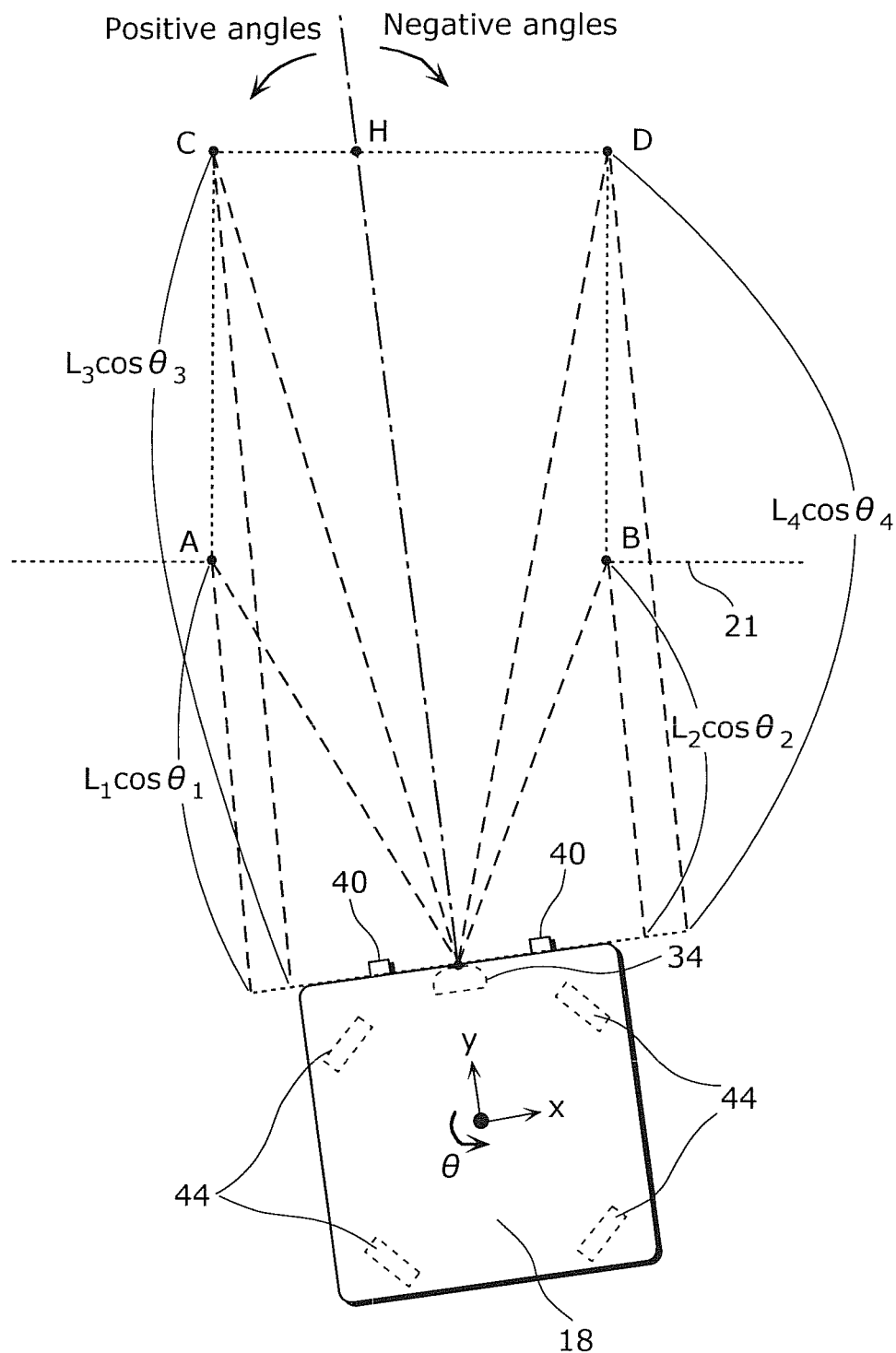
FIG. 10 illustrates a top view of the base unit according to Embodiment 1 of the present invention.

Next, the approaching position is corrected so as to make the distance between the traveling vehicle 12 and the first point P1 $L_1$ and the distance between the traveling vehicle 12 and the second point P2 $L_2$ equal. In addition, the orientation of the pedestal unit 18 is corrected so as to make distance $L_1 \cos \theta_1$ and distance $L_2 \cos \theta_2$ shown in FIG. 10 equal (Step S14).

Then, the traveling vehicle 12 moves toward the docking area 20. The approaching position and orientation are corrected each time the coordinate measurement device 34 scans the whole detection area (Step S15).

On the other hand, when the obtained reference distance Ls is not equal to or longer than the first correction distance N1 in Step S12, the movement control unit 33 determines whether or not the reference distance Ls is equal to or longer than a second correction distance N2 (Step S16).

When the reference distance Ls is equal to or longer than the second correction distance N2, the movement control unit 33 obtains the data of the polar coordinates of the docking points detected by the docking point detection unit 36: the polar coordinates ($L_1$, $\theta_1$) of the first tentative point A at the shortest distance within a range of positive angles; the polar coordinates ($L_2$, $\theta_2$) of the second tentative point B at the shortest distance within a range of negative angles; the polar coordinates ($L_3$, $\theta_3$) of the third tentative point C at the longest distance within a range of positive angles included between the angle of the first tentative point A and the angle of the second tentative point B; and the polar coordinates ($L_4$, $\theta_4$) of the fourth tentative point D at the longest distance within a range of negative angles included between the angle of the first tentative point A and the angle of the second tentative point B (Step S17).

At this time, since the recess in the object 21 has been recognized as the docking area 20, the first point P1 is the first tentative point A, the second point P2 of the docking area 20 is the second tentative point B, the third point P3 is the third tentative point C, and the fourth point P4 is the fourth tentative point D.

In order to cause the traveling vehicle 12 to move into the docking area 20, the movement control unit 33 corrects the approaching position and orientation of the pedestal unit 18 using the first point P1, the second point P2 (the first tentative point A and the second tentative point B) of the docking area 20, the third point P3, the fourth point P4 (the third tentative point A and the fourth tentative point B) of the docking area 20, and the reference distance Ls. In this case, the movement control unit 33 gradually switches points to refer to, based on the reference distance Ls, from the first point P1 and the second point P2 to the third point P3 and the fourth point P4.

The movement control unit 33 thus uses the four points switching between the first and second points P1 and P2 and the third and fourth points P3 and P4 when the reference distance Ls is equal to or longer than the second correction distance N2 and shorter than the first correction distance N1. This is because the first point P1 and the second point P2 are out of the appropriate measurement range of the coordinate measurement device 34 when the reference distance Ls is shorter than the first correction distance N1, so that accurate measurement of the points is difficult. However, the points to be used for correction are gradually switched using the parameter S because switching from the first and second points P1 and P2 to the third and fourth points P3 and P4 at once may cause unstable operation because of discontinuous change in correction of the approaching position and orientation of the pedestal unit 18. The discontinuity is due to a difference in accuracy of detection of the distance to the first point P1 and second point P2 and detection of the distance to the third and fourth points P3 and P4 (The first and second points P1 and P2 are detected with higher accuracy because they are closer than the third and fourth points P3 and P4).

The second correction distance N2 is a minimum distance at or below which the approaching position or the orientation is not corrected based on the first and second points P1 and P2. In Embodiment 1, the first point P1 and the second point P2 are out of the maximum measurement range of the coordinate measurement device 34 when the reference distance Ls is shorter than the second correction distance N2.

The approaching position and orientation are corrected according to the above expression (Math. 3).

$K_{AB}^x$ denotes an approaching position correction gain for the first point P1 and the second point P2 (the first tentative point A and the second tentative point B). $K_{CD}^x$ denotes an approaching position correction gain for the third point P3 and the fourth point P4 (the third tentative point C and the fourth tentative point D). $K_{AB}^\theta$ denotes an orientation correction gain for the first point P1 and the second point P2 (the first tentative point A and the second tentative point B). $K_{CD}^\theta$ denotes an orientation correction gain for the third point P3 and the fourth point P4 (the third tentative point C and the fourth tentative point D).

As shown in FIG. 9, S is proportional to the reference distance Ls when the reference distance Ls is not longer than the first correction distance N1 and not shorter than the second correction distance N2. The longer the reference distance Ls is, the larger S is. The shorter the reference distance is, the smaller S is.

Next, the approaching position is corrected so as to make the distance $L_1$ and the distance $L_2$ equal and the distance $L_3$ and the distance $L_4$ equal. In addition, the orientation is corrected so as to make the distance $L_1 \cos \theta_1$ and the distance $L_2 \cos \theta_2$ shown in FIG. 10 equal and distance $L_3 \cos \theta_3$ and distance $L_4 \cos \theta_4$ shown in FIG. 10 equal (Step S18). Then, the traveling vehicle 12 moves toward the docking area 20.

On the other hand, when the movement control unit 33 has determined that the reference distance Ls is not equal to or longer than the second correction distance N2 in Step S16, the movement control unit 33 determines whether or not the reference distance Ls is equal to or longer than a third correction distance N3 (Step S19).

When the reference distance Ls is equal to or longer than the third correction distance N3, the movement control unit 33 obtains the data of the polar coordinates ($L_3$, $\theta_3$) and ($L_4$, $\theta_4$) of the third tentative point C and the fourth tentative point D, respectively, detected by the docking point detection unit 36 (Step S20).

At this time, since the recess in the object 21 has been recognized as the docking area 20, the first point P1 is the first tentative point A, the second point P2 is the second tentative point B, the third point P3 is the third tentative point C, and the fourth point P4 is the fourth tentative point D.

The approaching position and orientation are corrected according to the above expression (Math. 3).

$K_{CD}^x$ denotes an approaching position correction gain for the third point P3 and the fourth point P4 (the third tentative point C and the fourth tentative point D). $K_{CD}^\theta$ denotes an orientation correction gain for the third point P3 and the fourth point P4 (the third tentative point C and the fourth tentative point D) (see FIG. 9 for the relationship between the reference distance Ls and the parameter S). In this case, S=0.

Next, the approaching position is corrected so as to make the distance $L_3$ the distance $L_4$ equal. In addition, the orientation is corrected so as to make the distance $L_3 \cos \theta_3$ and the distance $L_4 \cos \theta_4$ shown in FIG. 10 equal (Step S21).

The approaching position and orientation are corrected using the third and fourth points P3 and P4 (the third tentative point C and the fourth tentative point D) when the reference distance Ls is shorter than the second correction distance N2 because only the third point P3 and the fourth point P4 can be reliably measured. When the reference distance Ls is shorter than the second correction distance N2, the first point P1 and the second point P2 is out of the maximum measurement range of the coordinate measurement device 34. The movement control unit 33 therefore corrects the approaching position and orientation using the third point P3 and the fourth point P4 which the movement control unit 33 can detect.

On the other hand, when the reference distance Ls is shorter than the third correction distance N3 in Step S19, the traveling vehicle 12 is moved further into the docking area 20 without correcting the approaching position or the orientation by the movement control unit 33.

The third correction distance N3 is a minimum distance at or below which the approaching position or the orientation is not corrected based on the third and fourth points P3 and P4. In Embodiment 1, the third point P3 and the fourth point P4 are out of the maximum measurement range of the coordinate measurement device 34 when the reference distance Ls is shorter than the third correction distance N3.

The traveling vehicle 12 is thus moved straight without correcting the position or the orientation of the pedestal unit 18 because the third point P3 and the fourth point P4 are out of the maximum measurement range of the coordinate measurement device 34 and the traveling vehicle 12 has advanced into the docking area 20 to some extent and the orientation control has almost disposed the traveling vehicle 12 in an orientation such that the traveling vehicle 12 is docked in the docking area 20 (Step S15).

The traveling vehicle 12 is further moved into the docking area 20 while the movement control unit 33 compares the reference distance Ls with the first correction distance N1, the second correction distance, and the third correction distance N3. Then, the movement control unit 33 detect whether or not a signal from the proximity sensors 40 have been detected (Step S22).

Figure 11:
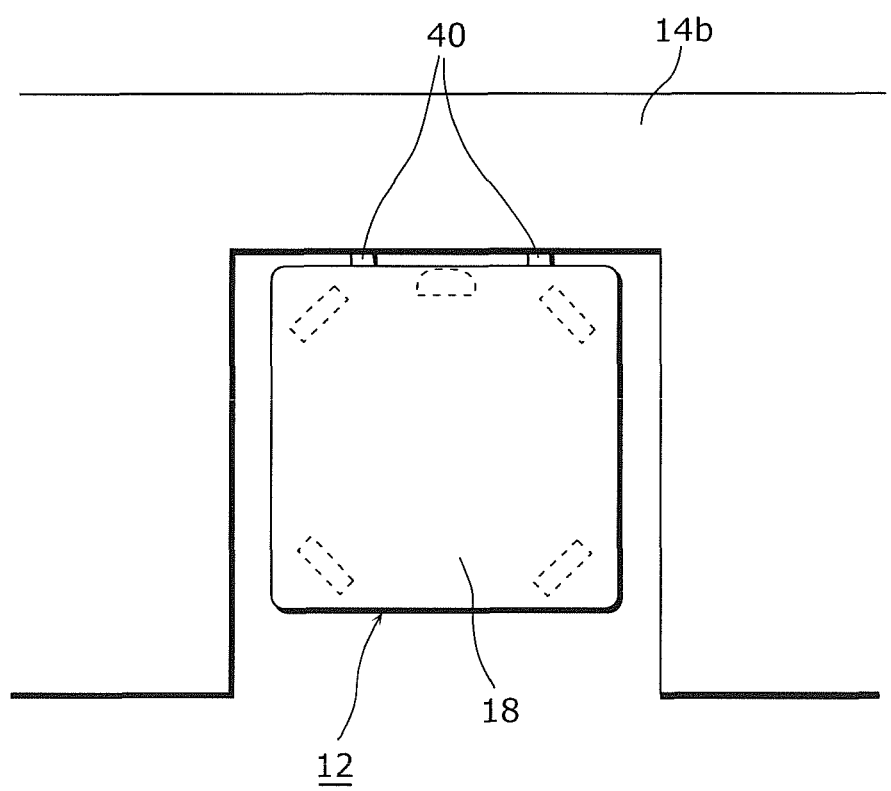
FIG. 11 illustrates a top view of the base unit and the foot unit if the stationary unit according to Embodiment 1 of the present invention.

When the proximity sensors 40 of the traveling vehicle 12 contact with the rear panel 51 of the docking area 20 as shown in FIG. 11, the movement control unit 33 receives a positioning signal and causes the body drive unit 31 to stop the traveling vehicle 12 (Step S23).

Here, the proximity sensors 40 may be, but not limited to, micro switches which detects proximity of the traveling vehicle 12 and the stationary unit 11 by detecting contact with the stationary unit 11. For example, they may be sensors which detect proximity of objects without contact, using ultrasonic sound or light. The coordinate measurement device 34 may be used instead of the proximity sensors 40 so that proximity is detected based on distance information of the coordinate measurement device 34.

Next, the movement control unit 33 sends a transformation signal to the transformation unit 41 to cause the lower part of the seat unit 16 held above the base support unit 14a to be lowered to lie on the base unit 14a. Next, the base unit 13 is formed on the bed 10 (Step S24).

On the other hand, when the movement control unit 33 detects no positioning signal in Step S22, the movement control unit 33 returns to Step S11 to obtain the reference distance Ls again.

In this manner, the traveling vehicle 12 fits into the docking area 20 of the stationary unit 11 by auto-guidance to form a bed. In this process, the traveling vehicle 12 smoothly moves into the docking area 20 while finely switching detection points of the docking area 20 in order to correct the approaching position and orientation, and thus allowing the traveling vehicle 12 to combine with the stationary unit 11.

Finally, the traveling vehicle 12 stops when the proximity sensor 40 contacts with the stationary unit 11 in a part forming the docking area 20. The contact is made between a tip of the proximity sensors 40 and the stationary unit 11, and thus has little impact on the stationary unit 11 or the traveling vehicle 12. Such damage on the stationary unit 11 or the traveling vehicle 12 may be further reduced by slowing the traveling vehicle 12 just before the proximity sensors 40 contact with the docking area 20. In addition, an operator (for example, a care-receiver) may cause the stationary unit 11 and the traveling vehicle 12 to separate by pressing the separation switch 43 when the they are in combination, forming the bed 10. Not only the stationary unit 11 and the traveling vehicle 12 may combine to form the bed 10, but also the bed 10 may separate into the stationary unit 11 and the traveling vehicle 12.

In Embodiment 1, the docking points on the docking area 20, which serve as marks for correcting the position and the orientation, are determined using the coordinate measurement device 34 which obtains data of distances and angles by scanning laser light. Then, from the obtained data of polar coordinates, the closest point within the range of positive angles, the closest point within the range of negative angles, the farthest point within the range of positive angles, and the farthest point within the range of negative angles, are determined to be the docking points. The present invention is not limited to this. For example, marks, such as reflectors, are provided on positions corresponding to the first point P1, the second point P2, the third point P3, and the fourth point P4 on the docking area 20, and a camera provided on the traveling vehicle 12 captures images of the marks and the vicinity thereof. The traveling vehicle 12 may obtain relative coordinates of the marks with respect to the traveling vehicle 12 by image analysis. Specifically, the traveling vehicle 12 may determine the relative coordinates by emitting infrared light from an infrared (light emitting diode) LED to the marks, capturing reflected infrared with an infrared camera, and then performing an image analysis to identify points having the highest intensities as four points of the first point P1, the second point P2, the third point P3, and the fourth point P4. In this case, the approaching position and the orientation are corrected without recognition as to whether or not a recess is the docking area 20 because it is obvious that the infrared reflected from the markers indicates four corners of the docking area 20. In addition, the present invention is applicable to a docking area 20 which has a shape other than a rectangle, such as a trapezoid, a parallelogram, or a rhombus, using pre-registered reference dimensions thereof. The coordinate system to be used for indicating docking points is not limited to the polar coordinate system but may be any desired coordinate system such as a Cartesian coordinate system.

Embodiment 2

In Embodiment 2, a bed 10 is a similar one to the bed 10 according to the Embodiment 1, and thus a traveling vehicle 12 is guided to a docking area 20 of a stationary unit 11 to combine with the stationary unit 11. A docking area recognition unit 37 recognizes whether or not four sides of a rectangle having, as vertices, four points detected by a docking point detection unit 36 is the docking area 20 using the same method as described in Embodiment 1.

However, The method in which the traveling vehicle 12 moves into the docking area 20 of the stationary unit 11 with guidance is different from that of Embodiment 1. The following describes the method according to Embodiment 2 in detail.

Figure 12:
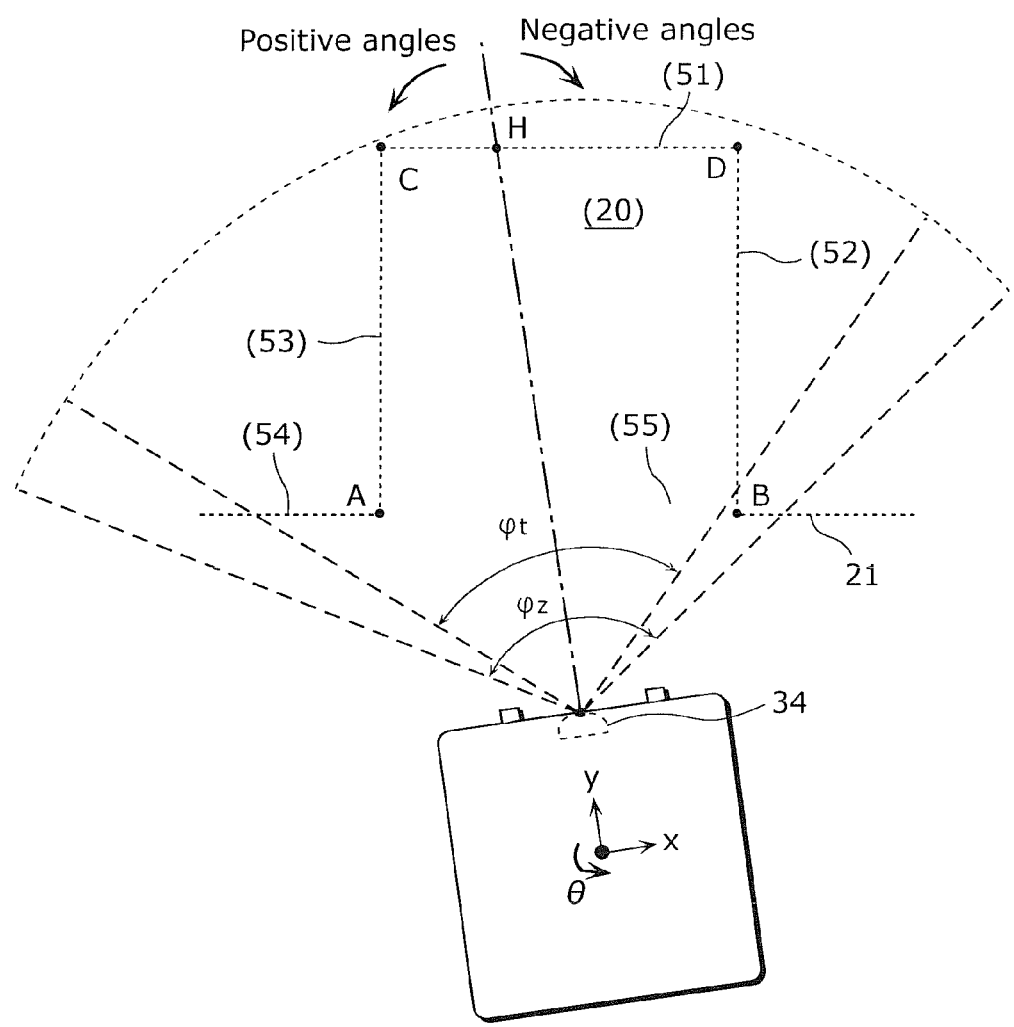
FIG. 12 illustrates a top view of a base unit according to Embodiment 2 of the present invention.

FIG. 12 illustrates a top view of a pedestal unit 18 of the traveling vehicle 12 and an object 21.

A maximum measurement range $\phi z$ is a maximum range of angles across which the coordinate measurement device 34 is capable of measuring points. In FIG. 12, the dashed lines forming a sector having a central angle of the maximum measurement range $\phi z$ indicate a detection area. An appropriate measurement range $\phi t$, which is present within the maximum measurement range $\phi z$, is a range in which an inflection of the object is reliably measured (in Embodiment 2, the appropriate measurement range $\phi t$ is set to be an area 30% smaller than the maximum measurement range $\phi z$).

The appropriate measurement range $\phi t$ may be set by a movement control unit 33, which obtains a travel speed of the traveling vehicle 12 from the body drive unit 31 and sets the appropriate measurement range $\phi t$ to a smaller range when the traveling vehicle 12 travels fast, and to a larger range when the traveling vehicle 12 travels slow.

As shown in FIG. 12, a center line of the coordinate measurement device 34 is also a center line of the maximum measurement range and a center line of the appropriate measurement range φt. Angles toward the left side of the center line are positive angles, and angles toward the right side are negative angles.

In order for the traveling vehicle 12 to smoothly move into the docking area 20, control laws of correction of the approaching position and orientation of the traveling vehicle 12 need to be changed depending on a positional relation between the traveling vehicle 12 and the docking area 20.

In Embodiment 2, the approaching position and orientation of the traveling vehicle 12 are corrected using the appropriate measurement range φt. In comparison with the method in which the control laws of correction of the approaching position and orientation of the traveling vehicle 12 are changed using the reference distance Ls, the control laws can be changed using only angles measured by the coordinate measurement device 34 in the method according to Embodiment 2, and thus calculation of the reference distance Ls is not necessary.

Figure 13:
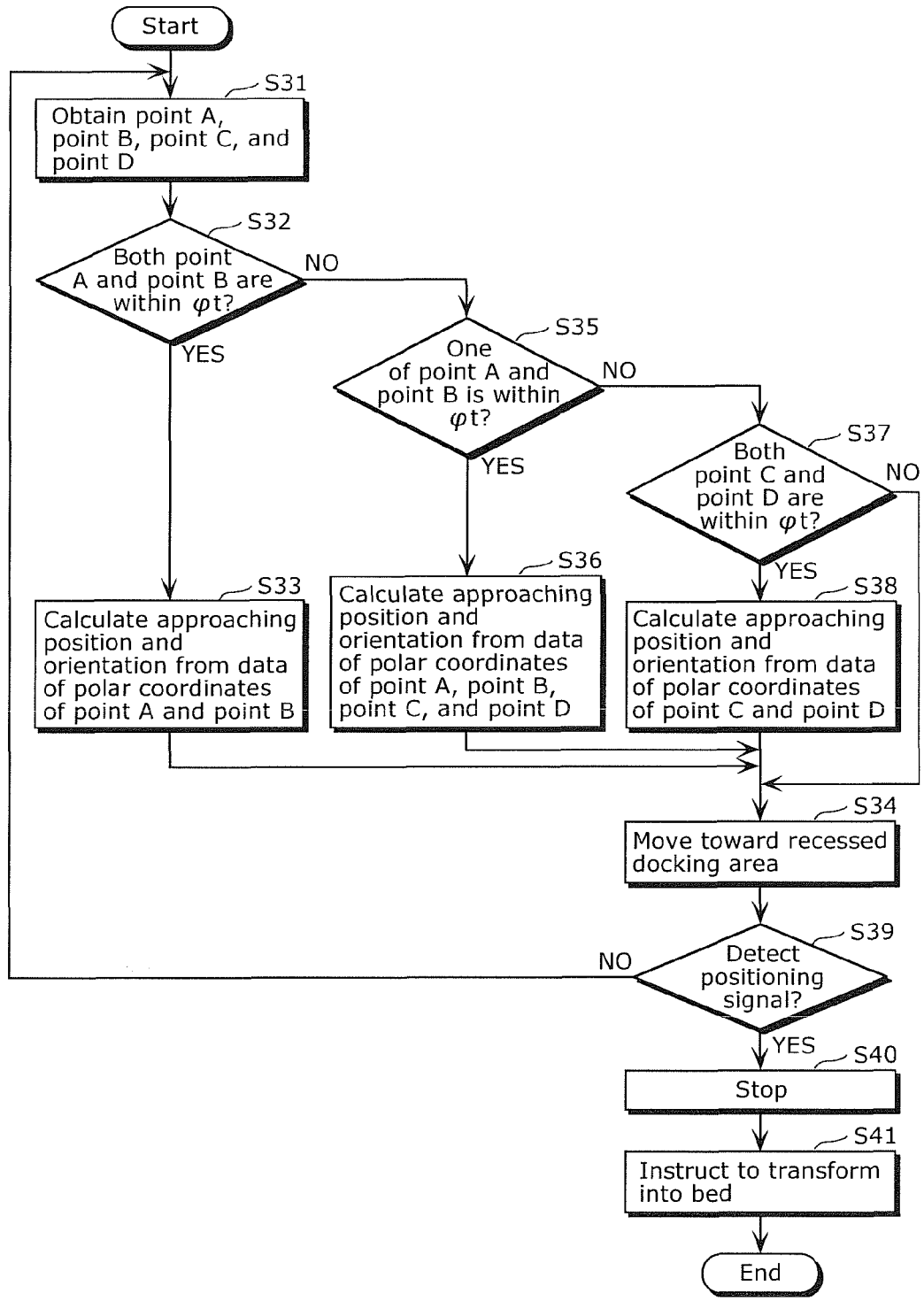
FIG. 13 is a flowchart of a movement control unit according to Embodiment 2 of the present invention.
Figure 14:
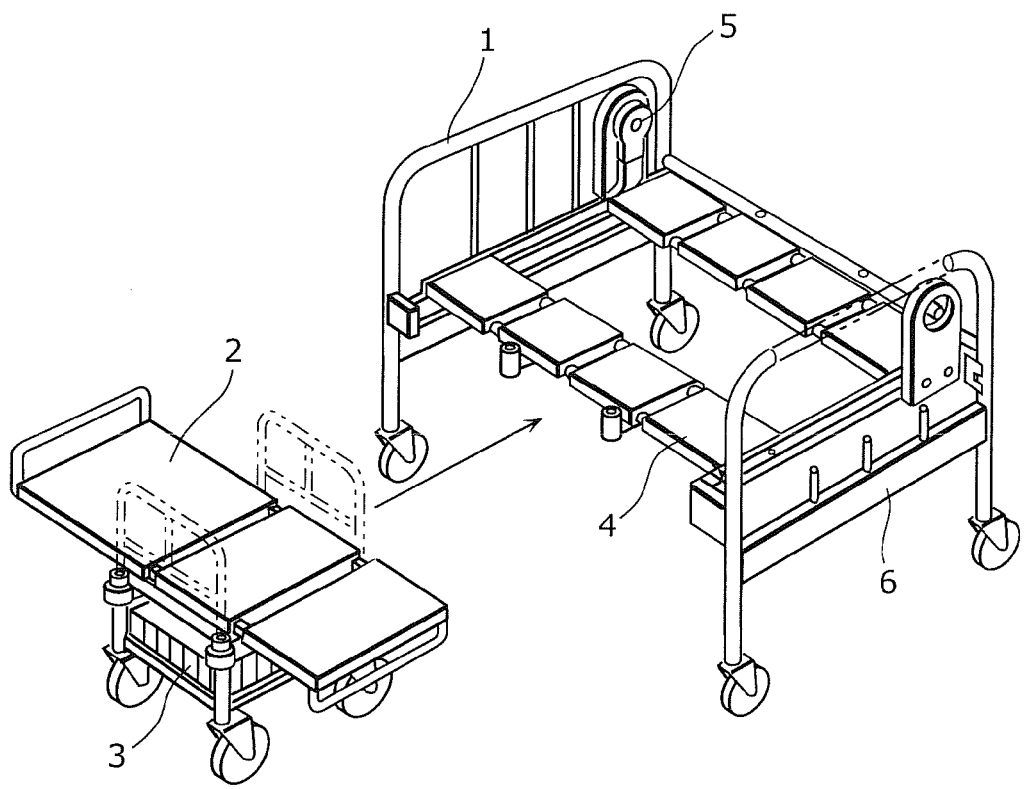
FIG. 14 schematically illustrates a perspective view of a bed in a conventional configuration.

The following describes the change of the control laws of correction of the approaching position and orientation using the appropriate measurement range φt with reference to a flowchart of the movement control unit 33 shown in FIG. 13.

First, the movement control unit 33 obtains data of polar coordinates of docking points detected by the docking point detection unit 36: the polar coordinates $(L_1, \theta_1)$ of a first tentative point A at the shortest distance within a range of positive angles; the polar coordinates $(L_2, \theta_2)$ of a second tentative point B at the shortest distance within a range of negative angles; the polar coordinates $(L_3, \theta_3)$ of a third tentative point C at the longest distance within a range of positive angles; and the polar coordinates $(L_4, \theta_4)$ of a fourth tentative point D at the longest distance within a range of negative angles (Step S31).

Next, the movement control unit 33 determines whether or not both of the first tentative point A and the second tentative point B are within the appropriate measurement range φt (Step S32).

When both of the first tentative point A and the second tentative point B are within the appropriate measurement range φt (that is, both of the relational expressions, $|\theta1|\leq\phi t/2$ and $|\theta2|\leq\phi t/2$, are satisfied), the movement control unit 33 corrects the approaching position and orientation of the traveling vehicle 12 with reference to the first point P1 and the second point P2 (the first tentative point A and the second tentative point B) in order to cause the traveling vehicle 12 to move into the docking area 20.

The approaching position and orientation are corrected using the first point P1 and the second point P2 (the first tentative point A and the second tentative point B) because the coordinate measurement device 34 are farther from the third point P3 and the fourth point P4 and the approaching position and orientation can be more accurately corrected using only the first point P1 and the second point P2, which are the inflections on the entrance side and closer from the coordinate measurement device 34 (Step S33).

Next, the traveling vehicle 12 moves toward the docking area 20 (Step S34).

On the other hand, when it is determined in Step S32 that at least one of the first tentative point A and the second tentative point B are not within the appropriate measurement range φt, the movement control unit 33 determines whether or not one of the first tentative point A and the second tentative point B is within the appropriate measurement range φt and the other is out of the appropriate measurement range φt (that is, $|\theta1|\leq\phi t/2$ and $|\theta2|>\phi t/2$, or $|\theta1|>\phi t/2$ and $|\theta2|\leq\phi t/2$) (Step S35).

When one of the first tentative point A and the second tentative point B is within the appropriate measurement range φt and the other is out of the appropriate measurement range φt, the movement control unit 33 corrects the approaching position and orientation of the traveling vehicle 12 with reference to the first point P1 and the second point P2 (the first tentative point A and the second tentative point B) and the third point P3 and the fourth point P4 (the third tentative point C and the fourth tentative point D) in order to cause the traveling vehicle 12 to move into the docking area 20.

In order to cause the traveling vehicle 12 to move into the docking area 20, the movement control unit 33 corrects the approaching position and orientation using the first point P1 and the second point P2 (the first tentative point A and the second tentative point B) of the docking area 20, and the third point P3 and the fourth point P4 (the third tentative point C and the fourth tentative point D) of the docking area 20.

The approaching position and orientation are corrected using an expression similar to the above expression (Math. 3). In Embodiment 2, S, which is in proportion to the reference distance Ls in Embodiment 1, is in proportion to an smaller one of the angles $|\theta1|$ and $|\theta2|$ (Step S36).

On the other hand, when it is determined in Step S32 that both of the first tentative point A and the second tentative point B are out of the appropriate measurement range φt, the movement control unit 33 determines whether or not both of the third tentative point C, which is the farthest point within a range of positive angles, and the fourth tentative point D, which is the farthest point within a range of negative angles, are within the appropriate measurement range φt (Step S37).

When both of the third tentative point C and the fourth tentative point D are within φt, the movement control unit 33 corrects the approaching position and orientation using the third point P3 and the fourth point P4 (the third tentative point C and the fourth tentative point D) of the docking area 20 in order to cause the traveling vehicle 12 to move into the docking area 20.

The approaching position and orientation are corrected using the third point P3 and the fourth point P4 (the third tentative point C and the fourth tentative point D) because the first point P1 and the second point P2 at the inflections on the front side are out of the detection area of the coordinate measurement device 34. The approaching position and orientation are therefore corrected only using the third point P3 and the fourth point P4, which are reliably measured (Step S38).

On the other hand, when it is determined in Step S37 that at least one of the third tentative point C and the fourth tentative point D are out of the appropriate measurement range φt, the traveling vehicle 12 is further moved into the docking area 20 without correcting the approaching position or the orientation by the movement control unit 33.

The traveling vehicle 12 is moved straight without correcting the position or the orientation because the first point P1 and the second point P2 are out of the detection area of the coordinate measurement device 34 and the traveling vehicle 12 has advanced into the docking area 20 to some extent in an orientation such that the traveling vehicle 12 almost fits in the docking area 20.

Then, the movement control unit 33 detects whether or not a positioning signal from a proximity sensors 40 has been detected (Step S39).

The movement control unit 33 repeats the moving process up to Step S39 until a positioning signal from the proximity sensors 40 is detected. When proximity sensors 40 of the traveling vehicle 12 are pressed against a rear panel of the docking area 20 as shown in FIG. 11, the movement control unit 33 receives a positioning signal and stops the moving (Step S40).

Next, the movement control unit 33 sends a transformation signal to the transformation unit 41 to cause a lower part of a seat unit 16 held above a base support unit 14a is lowered to be on the base support unit 14a. Next, the base unit 13 is formed on the bed 10 (Step S41).

On the other hand, when the movement control unit 33 receives no positioning signal in Step S39, the movement control unit 33 returns to Step S31.

In this manner, the traveling vehicle 12 fits into the docking area 20 of the stationary unit 11 by auto-guidance to form the bed 10. In this process, the traveling vehicle 12 smoothly moves into the docking area 20 while finely switching detection points of the docking area 20 in order to correct the approaching position and orientation, and thus allowing the traveling vehicle 12 to combine with the stationary unit 11.

INDUSTRIAL APPLICABILITY

The traveling vehicle according to the present invention moves into a docking area by auto-guidance without hitting against side walls, and is therefore applicable to combination devices such as a bed.

[Reference Signs List]

| | |
|---|---|
| 10 | Bed |
| 11 | Stationary unit |
| 12 | Traveling vehicle |
| 13 | Base unit |
| 14a | Base support unit |
| 14b | Foot unit |
| 15 | Lateral base unit |
| 16 | Seat unit |
| 17a | Right armrest unit |
| 17b | Left armrest unit |
| 18 | Pedestal unit |
| 19 | Operation panel |
| 20 | Docking area |
| 21 | Object |
| 31 | Body drive unit |
| 32 | Joystick |
| 33 | Movement control unit |
| 34 | Coordinate measurement device |
| 35 | Reference distance detection unit |
| 36 | Docking detection unit |
| 37 | Docking area recognition unit |
| 38 | Self-guidance start switch |
| 40 | Proximity sensor |
| 41 | Transformation unit |
| 43 | Separation switch |
| 44 | Wheel |

The invention claimed is:

1. A vehicle which is self-propelled and accommodable in a quadrilateral accommodation area, said vehicle comprising:
a coordinate measurement device which obtains coordinates of a first point, coordinates of a second point, coordinates of a third point, and coordinates of a fourth point, the first point and the second point being located on an entrance side of the accommodation area, the third point and the fourth point being located on a rear side of the accommodation area, and the coordinates of the first, second, third and fourth points being relative coordinates with respect to a position of said vehicle;
a reference distance detection unit configured to detect a reference distance indicating a distance between said vehicle and a line connecting the third point and the fourth point in the accommodation area; and
a control unit configured (i) to control a driving unit to move said vehicle based on the coordinates of the first point, the coordinates of the second point, the coordinates of the third point, and the coordinates of the fourth point when the reference distance is longer than or equal to a second correction distance, and (ii) to control the driving unit to move said vehicle based on only the coordinates of the third point and the coordinates of the fourth point when the reference distance is shorter than the second correction distance.

2. The vehicle according to claim 1, further comprising:
an accommodation point detection unit configured to determine, from the relative coordinates obtained from said coordinate measurement device, a point at a shortest distance within a range of positive angles to be a first tentative point, a point at a shortest distance within a range of negative angles to be a second tentative point, a point at a longest distance within the range of positive angles to be a third tentative point, and a point at a longest distance within the range of negative angles to be a fourth tentative point; and
an accommodation area recognition unit configured (i) to compare, with a reference dimension stored in advance, at least one of a distance between the first tentative point and the second tentative point, a distance between the second tentative point and the third tentative point, a distance between the third tentative point and the fourth tentative point, and a distance between the first tentative point and the fourth tentative point, and (ii) to determine the first tentative point to be the first point, the second tentative point to be the second point, the third tentative point to be the third point, and the fourth tentative point to be the fourth point, when the comparison shows a match between the first to fourth tentative points and the reference dimension.

3. The vehicle according to claim 1, wherein the coordinate measurement device measures relative coordinates of a plurality of points on an object with respect to the position of said vehicle.

4. The vehicle according to claim 1, wherein the vehicle is comprised in a bed that comprises a stationary unit having the quadrilateral accommodation area which is a quadrilateral area and has an entrance on one side of the quadrilateral area.

5. The vehicle according to claim 1, wherein, when the reference distance is shorter than the second correction distance, the first point and the second point are outside of a maximum measurement range of the coordinate measurement device.

6. The vehicle according to claim 1, wherein the second correction distance is a distance from the line connecting the third point and the fourth point to a point at which the first point and the second point are outside of a maximum measurement range of the coordinate measurement device, the maximum measurement range being a maximum range in degrees of which the coordinate measurement device is capable of measuring distances.

* * * * *